United States Patent [19]
Bittner

[11] Patent Number: 5,813,300
[45] Date of Patent: Sep. 29, 1998

[54] PRECISION CENTER WITH AN INTERCHANGEABLE DOUBLE-ARCUATE FLOATING COLLET

[75] Inventor: Edward H. Bittner, Madison, Conn.

[73] Assignee: Sikorsky Aircraft Corporation, Stratford, Conn.

[21] Appl. No.: 828,019

[22] Filed: Mar. 27, 1997

[51] Int. Cl.$^6$ ........................................ B23B 31/40
[52] U.S. Cl. ............................. 82/150; 279/2.03
[58] Field of Search ............................ 82/150, 169, 168; 279/2.03, 2.02, 2.12, 2.11, 47, 50, 127

[56] References Cited

U.S. PATENT DOCUMENTS

| | | | |
|---|---|---|---|
| 3,311,383 | 3/1967 | Cox | 279/2.03 |
| 3,360,276 | 12/1967 | Peffer | 279/2.12 |
| 3,387,865 | 6/1968 | Ross | 279/2.03 |

*Primary Examiner*—Andrea L. Pitts
*Assistant Examiner*—Mark Williams
*Attorney, Agent, or Firm*—Terrance J. Radke

[57] ABSTRACT

A precision center for mounting a workpiece for precision machining thereof includes a modified head center, an actuating assembly, a drive assembly, and a double-arcuate floating collet. The actuating assembly is mounted within the modified head center and operative to generate an actuating force. The drive assembly is mounted within the modified head center, is mechanically coupled in combination with the actuating assembly, and is operative in response to the actuating force to generate a drive force. The double-arcuate floating collet is integrated in combination with the modified head center, is mechanically coupled in combination with the drive assembly, and is operative in response to the drive force to be alternatively reconfigured to an expanded condition wherein the double-arcuate floating collet is expanded to simultaneously frictionally engage the modified head center and the workpiece for precision machining thereof and to a contracted condition wherein the workpiece may be disengaged from the modified head center.

18 Claims, 4 Drawing Sheets

PRECISION CENTER WITH AN INTERCHANGEABLE DOUBLE-ARCUATE FLOATING COLLET

DESCRIPTION

TECHNICAL FIELD

The present relates to tooling for precision machining of mechanical components, and more particularly, to a precision center with a interchangeable double-arcuate floating collet for the precision machining of mechanical components that is operative to establish precise manufacturing datums and allows the use of a low axial machining force.

BACKGROUND OF THE INVENTION

The precision machining of mechanical components such as gears, raceways, journals, threads, etc., in many applications, and particularly in applications in the aerospace industry, is of paramount importance. To ensure the precision machining of mechanical components, a majority of the manufacturing industry has adopted the use of computer numerically-controlled (CNC) machining technology wherein a computer system is used to control and regulate a machining apparatus, e.g., a cutter, a grinder, used in a particular machining process. While the use of CNC technology ensures the precision machining of mechanical components to extremely high tolerances in a repeatable manner, a condition precedent to the successful utilization of CNC technology in the precision machining of mechanical components is the requirement to establish precise manufacturing datums for the workpiece (as used herein, a workpiece is a mechanical component prior to precision machining) with respect to the machining apparatus. While a computer system can control and regulate the operation of machining apparatus with extremely high precision and repeatability, such precision/repeatability is of little avail if the physical location of the workpiece with respect to the machining apparatus, i.e., the manufacturing datums, is not established and maintained with a corresponding high degree of precision and repeatability.

Specialized tools are typically used in precision machining operations, and, in particular, CNC precision machining operations, for mounting a workpiece in workable combination with a machining apparatus. Such specialized tools have a dual function. The primary function of such specialized tools is to establish the manufacturing datums for precision machining operations with respect to the workpiece. To this end, such specialized tools are manufactured to a high degree of precision, i.e., high tolerances, so that such specialized tools are "qualified", i.e., certified as having a configuration that precisely establishes the required manufacturing datums for a workpiece. Secondarily, such specialized tools are used to exert an axial machining force against the workpiece during machining operations. The axial machining force is a condition precedent for the workpiece to be precisely indexed by means of the machining apparatus for precision machining of the workpiece.

Figure 1:
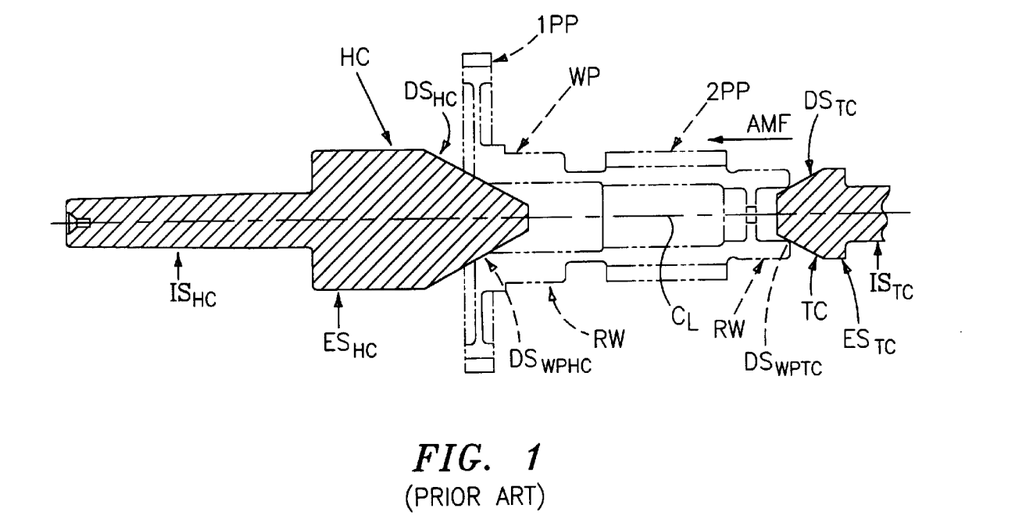
FIG. 1 is a cross-sectional view of one specialized tool that is currently used for the precision machining of mechanical components.

One specialized tool that is currently used to establish manufacturing datums for the precision machining of mechanical components is exemplarily illustrated in FIG. 1. The tool comprises a headstock center HC and a tail center TC which are operative in combination to define the manufacturing datums for precision machining of a workpiece WP mounted therebetween and to exert an axial machining force AMF against the workpiece WP wherein the workpiece WP can be indexed for precision machining operations. As exemplarily illustrated in FIG. 1, the workpiece WP is a compound planetary gear for the third stage of the compound planetary gear train for the transmission of the S-92™ helicopter being developed by Sikorsky Aircraft Corporation, the assignee of the present patent application. The compound planetary gear WP is subjected to several discrete precision machining operations, including cutting operations to form the gear teeth of a first planetary pinion 1PP and a second planetary pinion 2PP, and grinding operations to define raceways RW for the bearing assemblies that support the compound planetary gear in the third stage of the S-92™ compound planetary gear train.

The headstock center HC and the tail center TC are precision manufactured as solid members from a metallic blank of any conventional tool steel or stainless steel to include engagement segments $ES_{HC}$, $ES_{TC}$ and integration segments $IS_{HC}$, $IS_{TC}$, respectively. The integration segments $IS_{HC}$, $IS_{TC}$ are configured so that the headstock center HC and the tail center TC can be readily integrated in combination with conventional machining apparatus. With the headstock center HC and the tail center TC integrated in combination with the machining apparatus and the workpiece WP mounted therebetween, an axial machining force AMF is exerted against the workpiece WP by means of the headstock center HC and tail center TC combination so that rotational movement of the headstock center HC by means of the machining apparatus causes indexing, i.e., precise rotational movement, of the workpiece WP for precision machining thereof. During application of the axial machining force AMF, the tail center TC is either "dead", i.e., relative rotation between the tail center TC and the workpiece WP, or "live", i.e., includes bearings such that there is no relative rotation between the tail center TC and the workpiece WP, depending upon the axial machining force AMF being exerted through the tail center TC, as discussed in further detail hereinbelow.

Each engagement segment $ES_{HC}$, $ES_{TC}$ is precision manufactured, e.g., by grinding, to include a datum surface $DS_{HC}$, $DS_{TC}$. For the embodiment of the tool described herein, the datum surfaces $DS_{HC}$, $DS_{TC}$ are manufactured to form a standard angle of thirty degrees (30°) with respect to the centerline $C_L$ defined by the headstock and tail centers HC, TC in integrated combination with the machining apparatus. One skilled in the art will appreciate that other standard angles, e.g., 38°, (or even non-standard angles) may be used to define the datum surfaces $DS_{HC}$, $DS_{TC}$ of other headstock center HC, tail center TC combinations for precision machining operations.

Prior to initiating any precision machining operations, the workpiece WP is preground to include datum surfaces $DS_{WPHC}$, $DS_{WPTC}$ that are complementary to the datum surfaces $DS_{HC}$, $DS_{TC}$ of the headstock center HC and the tail center TC, respectively. The workpiece WP is mounted between the headstock center HC and the tail center TC and the axial machining force AMF, exerted through the tail center TC, causes frictional interaction between the respective datum surfaces $DS_{HC}$, $DS_{TC}$ of the headstock center HC, tail center TC and the datum surfaces $DS_{WPHC}$, $DS_{WPTC}$ of the workpiece WP. As a result of the frictional interaction between the datum surface $DS_{HC}$ of the headstock center HC and the corresponding datum surface $DS_{WPHC}$ of the workpiece WP, the rotational motion induced in the headstock center HC by the machining apparatus is coupled to the workpiece WP as an indexing motion, i.e., the workpiece WP is precisely rotated for machining operations.

Experience in precision machining operations utilizing the specialized tool described in the preceding paragraphs has shown that a high axial machining force AMF, on the order of 5,000N for the embodiment of the workpiece WP described herein, is required to provide a sufficient frictional interaction between the headstock center HC and the workpiece WP to achieve precise indexing of the workpiece WP during machining operations. This is a result of the fact that the interactive frictional forces developed between the datum surface $DS_{HC}$ of the headstock center HC and the corresponding datum surface $DS_{WPHC}$ of the workpiece WP are directly dependent upon the magnitude of the axial machining force AMF. Use of axial machining forces AMF that would be characterized as less than high axial machining forces AMF has resulted in increased rates of mechanical component rejection due to slippage between the datum surface $DS_{HC}$ of the headstock center HC and the corresponding datum surface $DS_{WPHC}$ of the workpiece WP, i.e., indexing error, that occurs as a result of insufficient frictional interaction between the datum surface $DS_{HC}$ of the headstock center HC and the corresponding datum surface $DS_{WPHC}$ of the workpiece WP.

Unfortunately, however, experience has also shown that the use of such high axial machining forces AMF tends to induce stresses into the workpiece WP being precision machined. Such induced stresses may result in distortions of the machined surfaces of the mechanical component after such component is removed from the tooling, which leads to rejection of such mechanical components as a result of machining imperfections. In addition, experience has further shown that there is still a probability, albeit low, of indexing error, even with high axial machining forces AMF, that results in mechanical component rejections.

Figure 2:
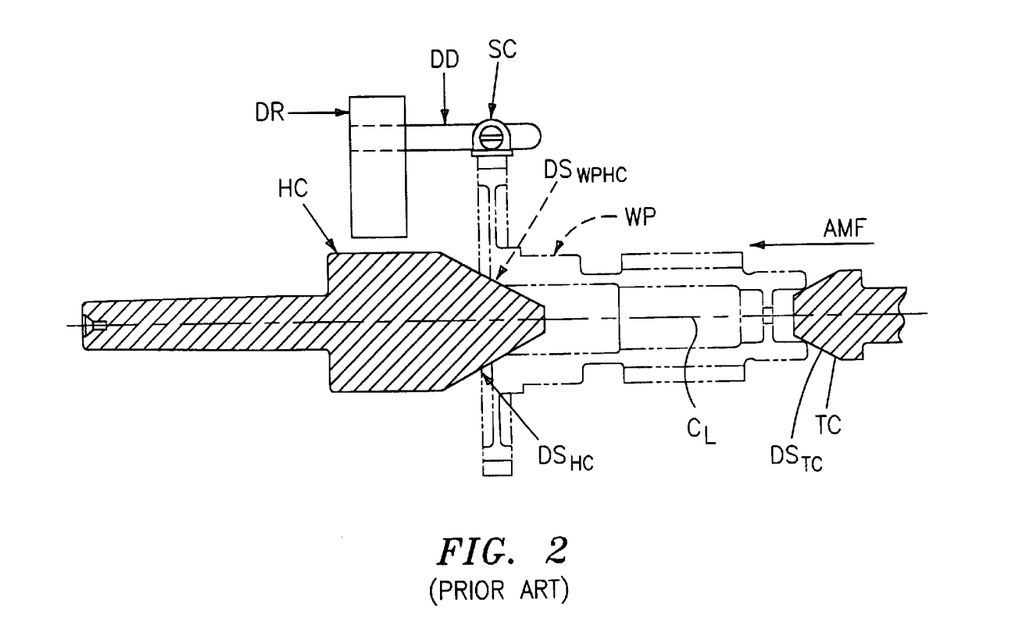
FIG. 2 is a cross-sectional view of another specialized tool, based upon the specialized tool illustrated in FIG. 1, that is currently used for the precision machining of mechanical components.

Another specialized tool for precision machining operations, which is configured to alleviate mechanical component rejections as a result of high axial machining forces AMF and/or indexing error, is exemplarily illustrated in FIG. 2. The headstock center HC and tail center TC have configurations and functionality as described hereinabove. A drive ring DR is secured in combination with the headstock center HC, a strap clamp SC (alternatively, a clamping ring) is secured in combination with the workpiece WP, and a drive dog DD is secured to the drive ring DR and the strap clamp SC to mechanically integrate the headstock center HC in combination with the workpiece WP. This mechanical integration allows low axial machining forces AMF, e.g., ≈800N where the workpiece WP is the compound planetary gear described hereinabove, to be used for precision machining of the workpiece WP. This mechanical integration, for all practical effects, also eliminates indexing errors since the workpiece is indirectly indexed by the headstock center HC through the mechanical combination of the drive ring DR, drive dog DD, and strap clamp SC. This specialized tooling embodiment, however, significantly increases the set-up time to integrate the tooling in combination with the workpiece WP. Further, the drive dog DD and the strap clamp SC may have to be repositioned if more than one machining operation is being effected on the workpiece WP. And in some circumstances this specialized tooling cannot be used since the only site on the workpiece WP to effect mechanical integration, i.e., to secure the strap clamp SC to the workpiece WP, is the zone to be machined on the workpiece WP.

A need exists to provide a precision center that allows precision machining of workpieces utilizing a low axial machining force, e.g., on the order of 800N for the embodiment of the workpiece WP described herein. Such precision center should be configured to provide a frictional interaction between the precision center and the workpiece of sufficient magnitude to minimize or eliminate indexing error. The configuration of such precision center should be such that the precision center does not need to be qualified prior to being utilized in precision machining operations. The precision center should have a configuration that does not require any reconfiguration or mechanical rearrangements if the workpiece WP is to be subjected to multiple precision machining operations. The precision center should be readily adaptable for use in precision machining operations with respect to a wide variety of workpieces WP of varying configuration.

DISCLOSURE OF THE INVENTION

Objects of the present invention include providing a precision center for precision machining operations that allows the use of a low axial machining force in such operations; providing a precision center that includes means for providing a frictional interaction between the precision center and the workpiece of sufficient magnitude to minimize or eliminate indexing error; providing a precision center that has a configuration that does not require qualification prior to being utilized in precision machining operations; providing a precision center that has a configuration that allows the precision center to be used for more than one machining operation on a single workpiece without requiring reconfiguration of the precision center; and providing a precision center that is readily adaptable for use in precision machining operations with respect to a wide variety of workpieces WP of varying configuration.

These and other objects of the invention are provided by a precision center according to the present invention that has utility for mounting a workpiece for one or more precision machining operations. The precision center comprises a modified head center, an actuating assembly, a drive assembly, and a double-arcuate floating collet. The actuating assembly, which is mounted within the modified head center, is operative to generate an actuating force. The drive assembly, which is mounted within the modified head center, is mechanically coupled in combination with the actuating assembly and is operative in response to the actuating force to generate a corresponding drive force.

The double-arcuate floating collet is mechanically integrated in combination with the modified head center and is mechanically coupled in combination with the drive assembly. The double-arcuate floating collet is operative in response to the drive force from the drive assembly to be alternatively reconfigured from a contracted condition to an expanded condition for precision machining operations and vice versa.

BRIEF DESCRIPTION OF THE DRAWINGS

A more complete understanding of the present invention and the attendant features and advantages thereof may be had by reference to the following detailed description when considered in conjunction with the following drawings wherein.

MODES FOR CARRYING OUT THE INVENTION

Referring now to the drawings wherein like reference numerals identify corresponding or similar elements throughout the several views, a precision center 10 according to the present invention is exemplarily illustrated in FIGS. 3–6. The precision center 10 is configured to mechanically engage a workpiece with frictional force of sufficient magnitude to minimize or eliminate indexing error and to allow the use of a low axial machining force, e.g., ≈800N for a workpiece WP such as the compound planetary gear described hereinabove, for precision machining operations. The precision center 10 provides improved tolerances in the machined workpiece, enhances repeatability in precision machining operations, reduces the workpiece rejection rate due to unacceptable tolerance deviations, reduces the workpiece rejection rate due to induced workpiece distortions as a result of excessive axial machining forces applied during precision machining operations, and eliminates any requirement to qualify the tooling prior to use thereof in precision machining operations. Furthermore, the precision center 10 according to the present invention can be readily adapted for use with a wide variety of workpieces WP of varying configuration.

The precision center 10 comprises a modified head center 20, an actuating assembly 40, a drive assembly 50, and an interchangeable double-arcuate floating collet 60. Each element comprising the precision center 10 is preferably manufactured from a metallic material such as stainless steel for mechanical strength and corrosion resistance; or alternatively, from a metallic material such as 4130 steel. The modified head center 20 has an external configuration that is similar to the external configuration of the prior art headstock center HC discussed hereinabove and includes an integration segment 22 and an engagement segment 24 having a precision-manufactured datum surface 26. Since the external configuration of the modified head center 20 of the present invention is similar to the external configuration of prior art headstock centers HC, there is no requirement or necessity to requalify the precision center 10 according to the present invention as a means for defining manufacturing datums prior to using the precision center 10 for precision machining operations. The precision center 10 is configured to be used in combination with a prior art tail center TC as described hereinabove.

Figure 4:
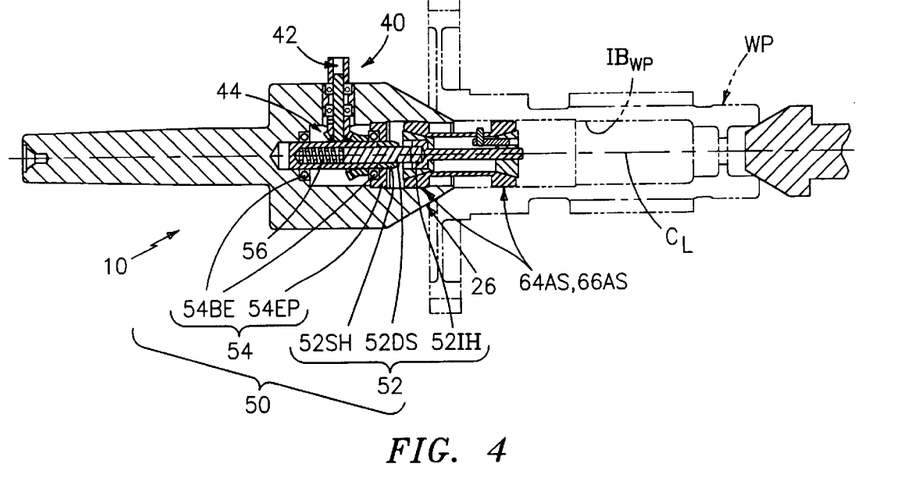
FIG. 4 is a cross-sectional view of FIG. 3 illustrating one embodiment of a drive mechanism for the precision center with an interchangeable double-arcuate floating collet according to the present invention.
Figure 4A:
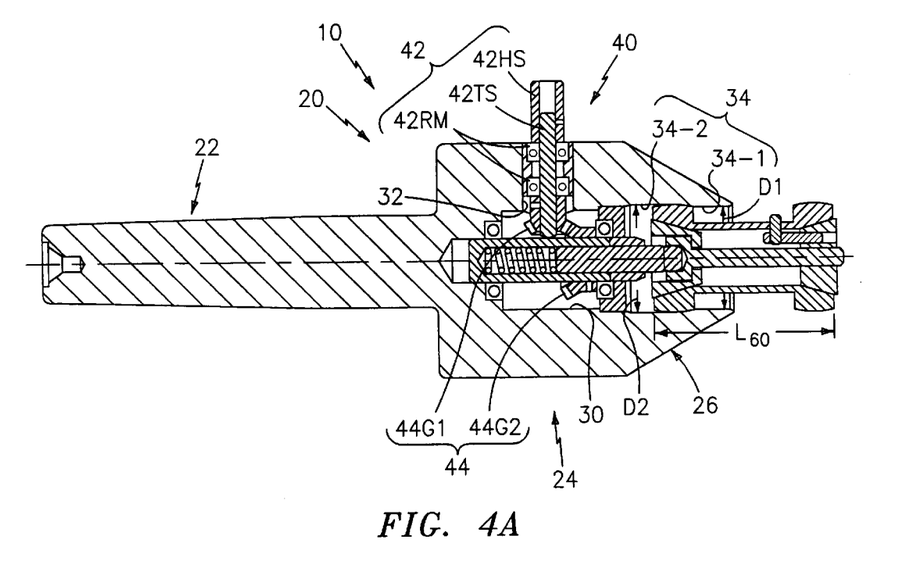
FIG. 4A is an enlarged cross-sectional of the precision center with an interchangeable double-arcuate floating collet of FIG. 4.

The modified head center 20 is manufactured to include a central cavity 30, an access channel 32, and an integration aperture 34 (see FIG. 4A). The central cavity 30 is configured for mounting particular elements of the actuating assembly 40 and the drive assembly 50 therein as discussed in further detail hereinbelow. The access channel 32 is configured for mounting particular elements of the actuating assembly 40 therein as discussed in further detail hereinbelow. The integration aperture 34 is configured for mounting of the interchangeable double-arcuate floating collet 60 in combination with the modified head center 20 and includes a first segment 34-1 having a first diameter D1 and a second segment 34-2 having a second diameter D2 wherein D1<D2. The integration aperture 34 facilitates the ready removal and replacement of double-arcuate floating collets 60 having different configurations in combination with the precision center 10, as discussed in further detail hereinbelow.

The actuating assembly 40, which is operative to allow an operator to apply an actuating force to operate the precision center 10 according to the present invention, is mechanically integrated in combination with the drive assembly 50. The actuating assembly 40 comprises an input mechanism 42 for applying the actuating force to operate the precision center 10 and a transfer mechanism 44 for transferring the actuating force from the input mechanism 42 to the drive assembly 50.

Figure 3:
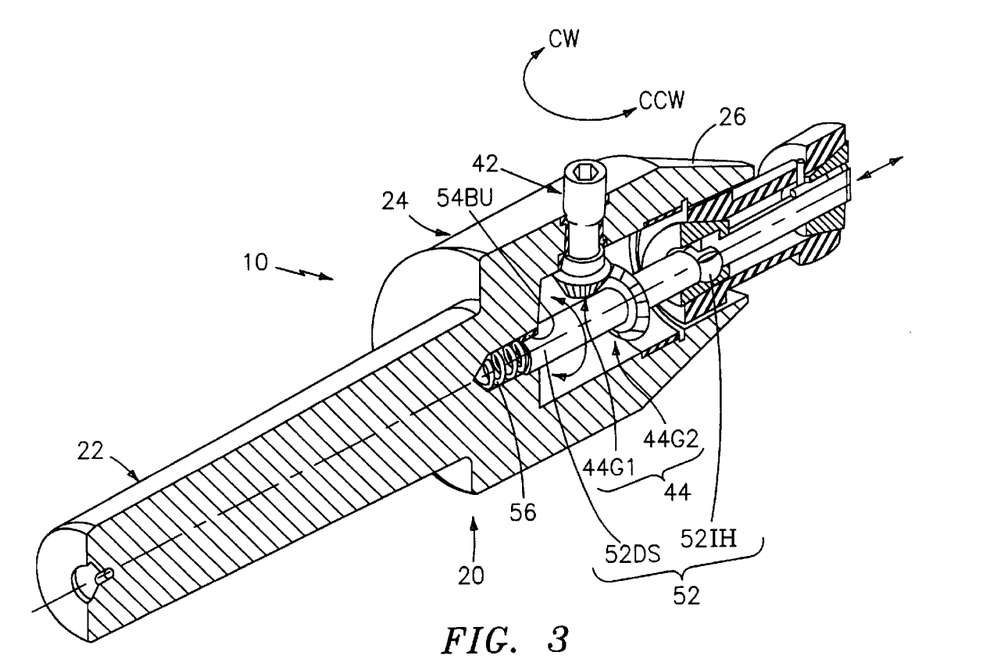
FIG. 3 is a perspective, partial cross-sectional view of a precision center with an interchangeable double-arcuate floating collet according to the present invention.
Figure 5:
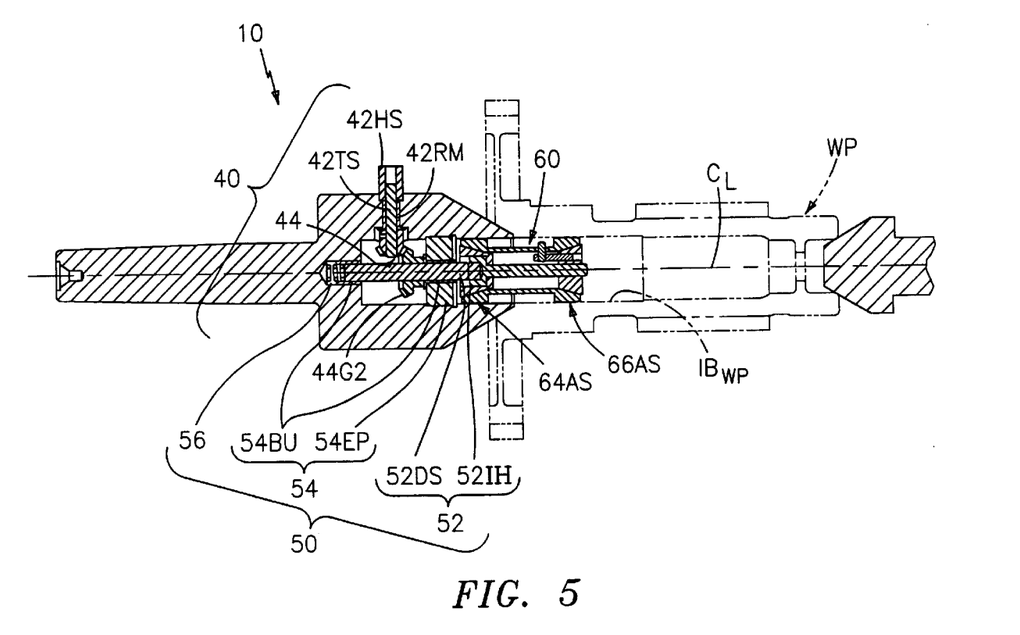
FIG. 5 is a cross-sectional view of FIG. 3 illustrating another embodiment of a drive mechanism for the precision center with an interchangeable double-arcuate floating collet according to the present invention.

The input mechanism 42, for the embodiment of the actuating assembly 40 illustrated in FIGS. 3–5, comprises a hex socket 42HS, a transfer shaft 42TS, and means 42RM for rotatably mounting the transfer shaft 42TS in combination within the modified head center 20. The hex socket 42HS is fixedly secured to one end of the transfer shaft 42TS. The transfer shaft 42TS is rotatably mounted in the access channel 32 using the means 42RM (in FIGS. 3, 5, the means 42RM is a bushing; in FIGS. 4, 4A, the means 42RM is a pair of bearings). The other end of the transfer shaft 42TS is integrated in combination with the transfer mechanism 44.

The transfer mechanism 44, for the embodiments of the actuating assembly 40 illustrated in FIGS. 3–5, comprises a first gear 44G1 that is fixedly secured in combination with the other end of the transfer shaft 42TS and a second gear 44G2 disposed in intermeshing combination with the first gear 44G1 and fixedly secured in combination with the drive assembly 50. The first and second gears 44G1, 44G2 in combination define a right-angle gear set for coupling the actuating force applied through the input mechanism 42 through a right angle to the drive assembly 50. For the illustrated embodiments, the first and second gears 44G1, 44G2 are bevel gears. One skilled in the art will appreciate that other types of gears, e.g., helical gears, may be used as the first and second gears 44G1, 44G2.

The actuating assembly 40 is operated by inserting a complementary hex wrench (not shown) into the hex socket 42HS and applying a clockwise or counterclockwise actuating force (see reference characters CW/CCW in FIG. 3) to the hex socket 42HS to cause a corresponding rotation of the transfer shaft 42TS to effect operation of the precision center 10. The rotation of the transfer shaft 42TS causes a corresponding rotation of the first and second gears 44G1, 44G2 to impart a rotational movement to the drive assembly 50.

The drive assembly 50 is operative, in response to the actuating force provided by the actuating assembly 40, to generate a drive force that is coupled to the interchangeable double-arcuate floating collar 60 to cause operation thereof. The drive assembly 50 comprises a drive mechanism 52 for applying the drive force to the interchangeable double-arcuate floating collet 60, a mechanism 54 for mounting the drive mechanism 52 in rotatable combination in the central cavity 30 of the modified head center 20, and a biasing mechanism 56 for applying a biasing force to the drive mechanism 52 to bias the drive mechanism 52 into mechanical engagement with the interchangeable double-arcuate floating collet 60 and, concomitantly, to maintain the drive mechanism 52 in mechanical engagement with the interchangeable double-arcuate floating collet 60 for operation of the precision center 10.

The drive mechanism 52 for the embodiment of the drive assembly 50 illustrated in FIGS. 3, 5 comprises a drive shaft 52DS having an integral drive head 52IH formed at one end thereof. The integral drive head 52IH is configured for mechanically coupling the drive assembly 50 in combination with the interchangeable double-arcuate floating collet 60 so that the drive force generated by the drive assembly 50 is coupled to the interchangeable double-arcuate floating collet 60 to cause operation thereof. For the described embodiments of the drive assembly 50, the integral drive head 52IH is a ball hex driver that allows swiveling movement between the drive assembly 50 and the interchangeable double-arcuate floating collet 60. The second gear 44G2 of the actuating assembly 40 is fixedly secured in combination with the drive shaft 52DS such that the actuating force, i.e., CW or CCW rotational movement of the second gear 44G2, causes the drive shaft 52DS to generate the drive force, i.e., a corresponding rotational movement of the drive shaft 52DS.

The mounting mechanism 54 for the embodiment of the drive assembly 50 illustrated in FIGS. 3, 5 comprises first and second bushings 54BU and an end plug 54EP. The bushings 54BU and the end plug 54EP in combination are operative to rotatably mount the drive shaft 52DS in the central cavity 30 in alignment with the centerline CL established by the modified head center 20 and the tail center TC.

The biasing mechanism 56 for the embodiment of the drive assembly 50 illustrated in FIGS. 3, 5 is a compressed coil spring disposed in abutting engagement with the other end of the drive shaft 52DS and a wall of the central cavity 30. The compressed coil spring 56 biases (to the right as illustrated in FIGS. 3, 5) and maintains the drive shaft 52DS in mechanical engagement with the interchangeable double-arcuate floating collet 60.

The drive mechanism 52 for the embodiment of the drive assembly 50 illustrated in FIGS. 4, 4A includes the drive shaft 52DS with integral drive head 52IH as described hereinabove and further includes a shaft housing 52SH. The drive shaft 52DS is mounted in non-rotatable combination within the shaft housing 52SH. The second gear 44G2 of the actuating assembly 40 is fixedly secured in combination with the shaft housing 52SH such that the CW or CCW rotational movement of the second gear 44G2 causes the drive shaft 52DS fixedly mounted in the shaft housing 52SH to generate the drive force, i.e., a corresponding rotational movement of the drive shaft 52DS, shaft housing 52SH combination.

The mounting mechanism 54 for the embodiment of the drive assembly 50 illustrated in FIGS. 4, 4A comprises first and second bearings 54BE and the end plug 54EP. The bearings 54BE and the end plug 54EP in combination are operative to rotatably mount the shaft housing 52SH, drive shaft 52DS combination in the central cavity 30 so that the drive shaft 52DS is aligned with the centerline CL established by the modified head center 20 and the tail center TC.

The biasing mechanism 56 for the embodiment of the drive assembly 50 illustrated in FIGS. 4, 4A is a compressed coil spring disposed within the shaft housing 52SH in abutting engagement with the other end of the drive shaft 52DS and an internal endwall of the shaft housing 52SH. The compressed coil spring 56 biases (to the right as illustrated in FIGS. 4, 4A) and maintains the drive shaft 52DS in mechanical engagement with the interchangeable double-arcuate floating collet 60.

The interchangeable double-arcuate floating collet 60 according to the present invention is operative, in response to the drive force coupled from the drive assembly 50, to be reconfigured from a contracted condition to an expanded condition for precision machining operations or vice versa (for the described embodiment of the drive assembly 50, depending upon whether the drive force is a clockwise or counterclockwise rotational force). In the expanded condition, the double-arcuate floating collet 60 simultaneously frictionally engages both the modified head center 20 (in particular, the surface defined by the diameter D2 of the integration aperture 34) and the workpiece WP (the wall defining the internal bore $IB_{WP}$ thereof). In the contracted condition, the double-arcuate floating collet 60 can be extracted from the workpiece WP and, as required, the modified head center 20 for replacement or removal.

Figure 6:
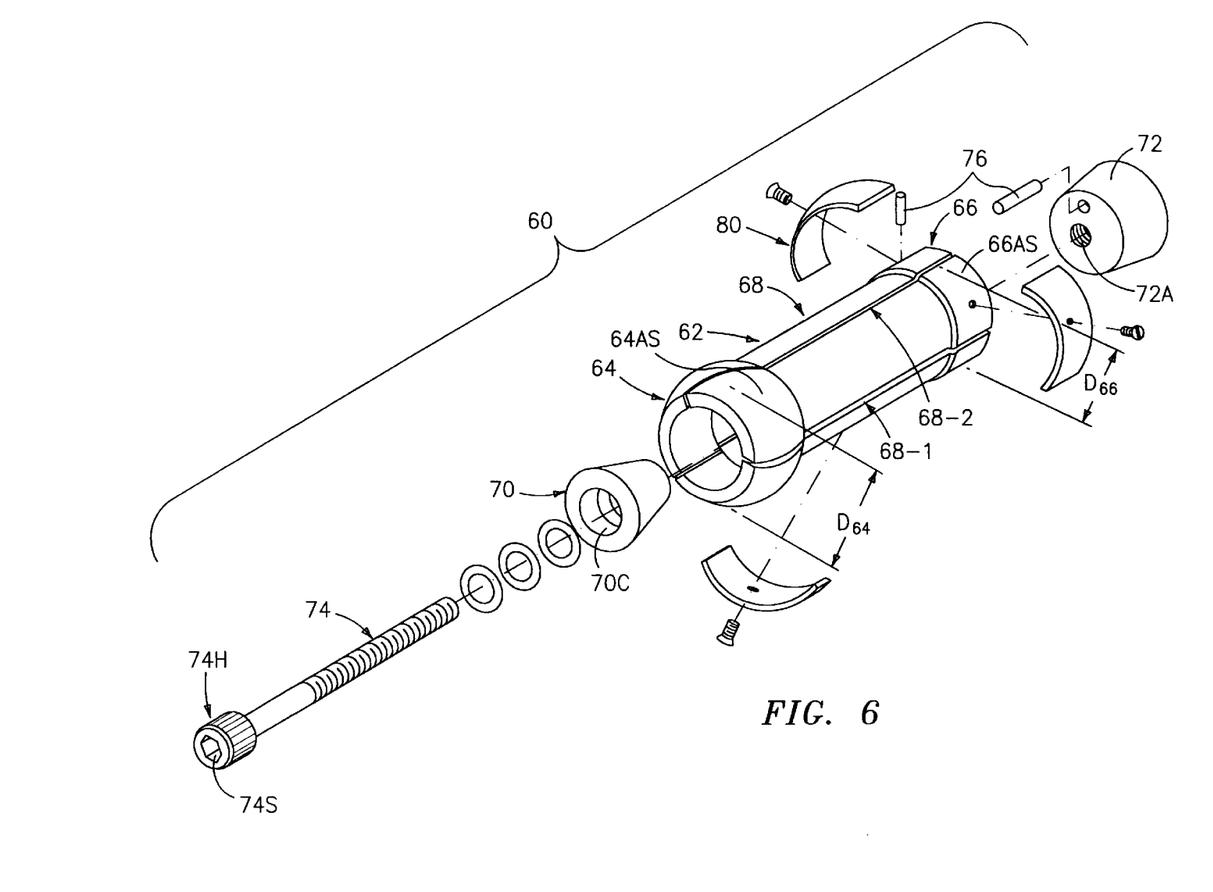
FIG. 6 is an exploded perspective view of one embodiment of an interchangeable double-arcuate floating collet according to the present invention.

Referring in particular to FIG. 6, the double-arcuate floating collet 60 comprises an integral (unitary) body member 62 having a design configuration that includes a first expansion collar 64, a second expansion collar 66, and a slotted cylinder 68 intermediate and contiguous with the first and second expansion collars 64, 66, a first expansion cone 70, a second expansion cone 72, an actuating screw 74 having a head 74H, and a detent device 76. The first and second expansion cones 70, 72, the actuating screw 74, and the detent device 76 in combination function as a means that is operative, in response to the drive force coupled from the drive assembly 50, to reconfigure the body member 62 from a contracted condition to an expanded condition for precision machining operations or vice versa.

The internal surfaces of the first and second expansion collars 64, 66 and the external surfaces of the first and second expansion cones 70, 72 are complementarily configured to facilitate mounting of the first and second expansion cones 70, 72 in mechanical engagement with the first and second expansion collars 64, 66, respectively. The first expansion cone 70 has a cavity 70C configured so that the head 74H of the actuating screw 74 is nested in abutting engagement with the endwall of the cavity 70C, but is free to rotate therein. The second expansion cone 72 is configured with a threaded bore 72A for threaded engagement with the actuating screw 74. The head 74H of the actuating screw 74 includes a socket 74S configured for mechanically coupling the integral drive head 521H of the drive shaft 52DS in swiveling combination with the actuating screw 74. The biasing mechanism 56 of the drive assembly 50 is operative to ensure that the integral drive head 521H of the drive shaft 52DS is maintained in mechanical engagement in the socket 74S during precision machining operations. A detent device 76, which for the described embodiment comprises a first roll pin secured in combination with the slotted cylinder 68 and a second roll pin secured in combination with the second expansion cone 72, is operative to preclude rotation of the second expansion cone 72 during threaded interactions between the actuating screw 74 and the second expansion cone 72.

The first and second expansion cones 70, 72 and the actuating screw 74 in combination function in a manner similar to a turnbuckle. In response to the drive force, the actuating screw 74 is subjected to rotational movement that causes a relative linear displacement between the first and second expansion cones 70, 72. A first drive force effects a decreasing linear displacement between the first and second expansion cones 70, 72 that causes the first and second expansion collars 64, 66 to radially expand (away from the centerline $C_L$ of FIGS. 3–5), i.e., the engaged condition of the precision center 10. Conversely, a second drive force effects an increasing linear displacement between the first and second expansion cones 70, 72 that causes the first and second expansion collars 64, 66 to radially contract (towards the centerline $C_L$ of FIGS. 3–5) to their original configurations, i.e., the contracted condition of the precision center 10.

The slotted cylinder 68 has a plurality of alternating expansion slots 68-1, 68-2 formed therethrough that extend through the first and second expansion collars 64, 66, respectively, such that each of the expansion collars 64, 66 comprises a plurality of contiguous segments. Fabricating the first and second expansion collars 64, 66 as a plurality of contiguous segments allows the first and second expansion collars 64, 66 to radially expand or contract in response to the drive force provide by the drive assembly 50 as described in the preceding paragraph. For the described embodiment of the double-arcuate floating collet 60, the slotted cylinder 68 is manufactured with three expansion slots 68-1 and three expansion slots 68-2 such that each of the expansion collars 64, 66 comprises three contiguous segments. One skilled in the art will appreciate that the double-arcuate floating collet 60 may have more or less alternating expansion slots 68-1, 68-2. By fabricating the slotted cylinder 68 with alternating expansion slots 68-1, 68-2, the double-arcuate floating collet 60 has maximal structural integrity while still embodying the necessary expansion/contraction functionality.

The external surfaces of the first and second expansion collars 64, 66 have an arcuate configuration. That is, each of the individual contiguous segments comprising the first and second expansion collars 64, 66 has an arcuate surface 64AS, 66AS (see also FIGS. 4, 5). The combination of the arcuate surfaces 64AS, 66AS of the expansion collars 64, 66 and the configuration of the integral drive head 521H that allows the double-arcuate floating collet 60 to swivel as required in the integration aperture 34 and/or the internal bore $IB_{WP}$ of the workpiece WP. These features of the double-arcuate floating collet 60 according to the present invention allow the double-arcuate floating collet 60 to swivel, i.e., "float", to accommodate eccentricities in the internal bore $IB_{WP}$ of the workpiece WP due to machining errors and/or distortions induced during heat treatment of the workpiece WP, i.e., the internal bore $IB_{WP}$ is not concentric with the centerline $C_L$ defined by the precision center 10 and the tail center TC.

In the contracted condition, the arcuate surfaces 64AS of the first expansion collar 64 define a diameter $D_{64}$ (see FIG. 6). The diameter $D_{64}$ of the first expansion collar 64 is dimensioned to be slightly greater than the diameter D1 of the integration aperture 34 and concomitantly dimensioned to be marginally greater than the diameter D2 of the integration aperture 34. Such dimensioning of the first expansion collar 64 allows an operator to press-fit insert the first expansion collar 64 through the first segment 34-1 of the integration aperture 34 with minimal force (the first expansion collar 64 contracts to a dimension slightly less than the diameter $D_{64}$ of the contracted condition) wherein the first expansion collar 64 "snap-fits" (the first expansion collar 64 expands back to the diameter $D_{64}$ defining the contracted condition) into mechanical engagement with the wall defining the second segment 34-2 of the integration aperture 34. This feature of the double-arcuate floating collet 60 according to the present invention allows the double-arcuate floating collet 60 to be readily integrated in combination with the modified head center 20 and precludes rotation of the double-arcuate floating collet 60 during operation of the precision center 10. Further, the mechanical engagement between the first expansion collar 64 and the wall defining the second segment 34-2 of the integration aperture 34 precludes the double-arcuate floating collet 60 from being accidentally disengaged from the modified head center 20 and prevents the double-arcuate floating collet 60 from being displaced from the integration aperture 34 as a result of the mechanical engagement force exerted by the drive shaft 52DS. In addition, the double-arcuate floating collet 60 can be readily removed from integration aperture 34 of the modified head center 20 for replacement of the double-arcuate floating collet 60, i.e., the double-arcuate floating collet 60 is readily "interchangeable".

In the contracted condition, the arcuate surfaces 66AS of the second expansion collar 66 define a diameter $D_{66}$ (see FIG. 6). The diameter $D_{66}$ of the second expansion collar 66 is dimensioned to allow the second expansion collar 66 of the double-arcuate floating collar 60 to be readily inserted in the internal bore $IB_{WP}$ of the workpiece WP with minimal force to integrate the precision center 10 in combination with the workpiece WP for precision machining thereof. The diameter $D_{66}$ of the second expansion collar 66 may be the same as, or different than, the diameter $D_{64}$ of the first expansion collar 64, depending upon the configuration of the modified head center 20 and the internal bore $IB_{WP}$ of the workpiece WP.

The double-arcuate floating collet 60 has a length $L_{60}$ (see FIG. 4A). The length $L_{60}$ is selected so that, with the double-arcuate floating collet 60 integrated in combination with the workpiece WP as described in the preceding paragraph, the second expansion collar 66 does not frictionally engage the inner bore $IB_{WP}$ of the workpiece WP in the zone where the workpiece WP is to be machined. This feature of the double-arcuate floating collet 60 according to the present invention ensures that the second expansion collar 66 of the double-arcuate floating collet 60 does not cause any stresses to be induced in the machining zone of the workpiece WP since such induced stresses could adversely affect the machined finish of the workpiece WP.

A set of double-arcuate floating collets 60, having second expansion collars 66 of varying diameters $D_{66}$ and varying lengths $L_{60}$, allows the precision center 10 according to the present invention to be used for precision machining operations with a wide variety of workpieces WP, i.e., enhances the utility of the precision center 10. In essence, the modified head center 20, the actuating assembly 40, and the drive assembly 50 of the precision center 10 are standardized for use with any workpiece WP in any precision machining operation. By selecting a specific double-arcuate floating collet 60 from a set of double-arcuate floating collets 60 of varying diameters $D_{66}$ and varying lengths $L_{60}$, i.e., the specific double-arcuate floating collet 60 having a defined diameter $D_{66}$ and a defined length $L_{60}$ that are complementary to the internal bore $IB_{WP}$ and machining zone of a particular workpiece WP, the precision center 10 according to the present invention can be readily adapted for precision machining operations with respect to such particular workpiece WP by removing (as required) and "replacing" the current double-arcuate floating collet 60 with the selected specific double-arcuate floating collet 60.

In some circumstances the internal bore $IB_{WP}$ of a workpiece WP is a finished surface that may be damaged if subjected to the frictional engagement forces exerted by the second expansion collar 66 in the expanded condition. To accommodate such workpieces WP, the double-arcuate floating collet 60 according to the present invention can further include buffer pads 80 (see FIG. 6). The buffer pads 80 are formed from a material that is more compliant than the material forming the internal bore $IB_{WP}$ of the workpiece WP. For example, the buffer pads 80 may be formed from brass, nylon, or rubber, as circumstances dictate. As the second expansion collar 66 is radially expanded, the buffer pads 80 mechanically engage the internal bore $IB_{WP}$ and may be subjected to mechanical deformation as a result of the radial expansion of the second expansion collar 66. Such mechanical deformation of the buffer pads 80, however, prevents the internal bore $IB_{WP}$ of the workpiece WP from being subjected to damage as a result of the frictional engagement forces exerted by the second expansion collar 66.

A buffer pad 80 is secured in combination with each segment of the second expansion collar 66. The securement means for the buffer pads 80 can be any conventional means for securing objects in combination; recessed screws are the securement means illustrated in FIG. 6. For embodiments of a double-arcuate floating collet 60 having buffer pads 80 secured in combination with the second expansion collar 66, the external surfaces of the buffer pads 80 define the arcuate surfaces of the second expansion collar 66.

A variety of modifications and variations of the present invention are possible in light of the above teachings. It is therefore to be understood that, within the scope of the appended claims, the present invention may be practiced otherwise than as specifically described hereinabove.

What is claimed is:

1. A precision center for mounting a workpiece for one or more precision machining operations, comprising:
    a modified head center;
    an actuating assembly mounted within said modified head center and operative to generate an actuating force;
    a drive assembly mounted within said modified head center and mechanically coupled in combination with said actuating assembly, said drive assembly being operative in response to the actuating force to generate a corresponding drive force; and
    a double-arcuate floating collet mechanically integrated in combination with said modified head and mechanically coupled in combination with said drive assembly, said double-arcuate floating collet including
        a body member having a design configuration that includes a first expansion collar having an arcuate configuration, a second expansion collar having an arcuate configuration, and a slotted cylinder intermediate and contiguous with said first and second expansion collars, and
        reconfiguration means disposed in combination with said body member and subjected to decreasing and increasing relative linear displacement, respectively, in response to the drive force from said drive assembly for alternatively reconfiguring said body member between a contracted condition and an expanded condition;
    wherein said decreasing relative linear displacement of said reconfiguration means causes radial expansion of said first and second expansion collars to mechanically engage said modified head center and the workpiece respectively in the expanded condition for one or more precision machining operations and wherein said increasing relative linear expansion of said reconfiguration means causes radial contraction of said first and second expansion collars to mechanically disengage from said modified head center and the workpiece, respectively, in the contracted condition for removal of said double-arcuate floating collet from said modified head center and the workpiece.

2. The precision center of claim 1 wherein said actuating assembly comprises:
    an input mechanism for generating the actuating force; and
    a transfer mechanism for transferring the actuating force to said drive assembly.

3. The precision center of claim 2 wherein said input mechanism comprises
    a transfer shaft rotatably mounted within said modified head center; and
    a hex socket fixedly secured to one end of said transfer shaft; and wherein said transfer mechanism comprises
        a first gear fixedly secured to the other end of said transfer shaft; and
        a second gear disposed in intermeshing combination with said first gear and fixedly secured in combination with said drive assembly.

4. The precision center of claim 1 wherein said drive assembly comprises:
    a drive mechanism operative in response to the actuating force for generating the drive force, said drive mechanism being mechanically coupled in combination with said double-arcuate floating collet;
    a mechanism for rotatably mounting said drive mechanism within said modified head center; and
    a biasing mechanism for applying a biasing force to said drive mechanism.

5. The precision center of claim 1 wherein said drive mechanism comprises a drive shaft having an integral drive head formed at one end thereof for mechanically coupling said drive shaft in combination with said double-arcuate floating collet.

6. The precision center of claim 1 wherein said drive mechanism comprises:
    a drive shaft having an integral drive head formed at one end thereof for mechanically coupling said drive shaft in combination with said double-arcuate floating collet; and
    a shaft housing;
    said drive shaft being mounted in non-rotatable combination within said shaft housing.

7. The precision center of claim 5 or 6 wherein said integral drive head is a ball hex driver.

8. The precision center of claim 1 wherein said reconfiguration means comprises:
    a first expansion cone internally mounted in combination with said body member in opposed relation to said first expansion collar;
    a second expansion cone internally mounted in combination with said body member in opposed relation to said second expansion collar;
    an expansion screw mounted in abutting engagement with said first expansion cone and mounted in threaded engagement with said second expansion collar and operative in response to the drive force to cause relative linear displacement between said first and second expansion cones to alternatively effect expansion and contraction of said first and second expansion collars.

9. The precision center of claim 8 further comprising a detent device disposed in combination with said second expansion cone and said slotted cylinder and operative to preclude relative rotational movement between said second expansion collar and said second expansion cone during operation of said expansion screw.

10. The precision center of claim 1 wherein said slotted cylinder has a plurality of alternating expansion slots formed therethrough that extend through said first and second expansion collars, respectively, such that each of said first and second expansion collars comprises a plurality of contiguous segments.

11. The precision center of claim 10 wherein said plurality of alternating expansion slots comprises:

three expansion slots that extend through said first expansion collar such that said first expansion collar comprises three segments; and three expansion slots that extend through said second expansion collar such that said second expansion collar comprises three segments.

12. The precision center of claim 10 further comprising a buffer pad secured in combination with each contiguous segment of said first and second expansion collars, respectively.

13. A double-arcuate floating collet for use in combination with a precision center to mount a workpiece for one or more precision machining operations, comprising:

a body member having a design configuration that includes a first expansion collar having an arcuate configuration, a second expansion collar having an arcuate configuration, and a slotted cylinder intermediate and contiguous with said first and second expansion collars; and reconfiguration means disposed in combination with said body member and operative in response to a drive force for alternatively reconfiguring said body member between a contracted condition and an expanded condition, wherein said first and second expansion collars are radially expanded to mechanically engage said precision center and the workpiece respectively, in the expanded condition for one or more precision machining operations and wherein said first and second expansion collars are radially contracted to mechanically disengage from the precision center and the workpiece, respectively, in the contracted condition for removal of said double-arcuate floating collet from combination with the precision center and the workpiece.

14. The double-arcuate floating collet of claim 13 wherein said reconfiguration means comprises:

a first expansion cone internally mounted in combination with said body member in opposed relation to said first expansion collar;

a second expansion cone internally mounted in combination with said body member in opposed relation to said second expansion collar;

an expansion screw mounted in abutting engagement with said first expansion cone and mounted in threaded engagement with said second expansion collar and operative in response to the drive force to cause relative linear displacement between said first and second expansion cones to alternatively effect expansion and contraction of said first and second expansion collars.

15. The double-arcuate floating collet of claim 14 further comprising a detent device disposed in combination with said second expansion cone and said slotted cylinder and operative to preclude relative rotational movement between said second expansion collar and said second expansion cone during operation of said expansion screw.

16. The double-arcuate floating collet of claim 13 wherein said slotted cylinder has a plurality of alternating expansion slots formed therethrough that extend through said first and second expansion collars, respectively, such that each of said first and second expansion collars comprises a plurality of contiguous segments.

17. The double-arcuate floating collet of claim 16 wherein said plurality of alternating expansion slots comprises:

three expansion slots that extend through said first expansion collar such that said first expansion collar comprises three segments; and three expansion slots that extend through said second expansion collar such that said second expansion collar comprises three segments.

18. The double-arcuate floating collet of claim 16 further comprising a buffer pad secured in combination with each contiguous segment comprising said first and second expansion collars, respectively.

* * * * *